United States Patent [19]

Peters

[11] Patent Number: 5,801,883
[45] Date of Patent: Sep. 1, 1998

[54] HIGH VISIBILITY REFLECTIVE TUBING FOR BICYCLE WHEELS

[76] Inventor: Robert V. Peters, 2310 Hwy. 101 North, Minneapolis, Minn. 55447

[21] Appl. No.: 759,398

[22] Filed: Dec. 4, 1996

[51] Int. Cl.⁶ .................................................. G02B 5/12
[52] U.S. Cl. .......................... 359/523; 359/538; 359/550
[58] Field of Search .......................... 359/515, 520, 359/522, 523, 529, 530, 533, 534–536, 538, 548, 550, 524

[56] References Cited

U.S. PATENT DOCUMENTS

| | | |
|---|---|---|
| 2,558,423 | 6/1951 | Dobrosky . |
| 3,612,612 | 10/1971 | Gannon . |
| 3,796,370 | 3/1974 | Speers et al. . |
| 4,708,399 | 11/1987 | Mendres . |
| 4,906,050 | 3/1990 | Soder et al. . |
| 5,349,470 | 9/1994 | Alexander ............ 359/523 |

OTHER PUBLICATIONS

3M Product Bulletin 580 Plus, dated Oct., 1993 "Scotchlite™ Plus Flexible Reflective Sheeting Series 580", 3M Commercial Graphics Division, St. Paul, MN.

*Primary Examiner*—James Phan
*Attorney, Agent, or Firm*—Haugen and Nikolai, P.A.

[57] ABSTRACT

A visual indicator for attachment to bicycle wheels to enhance visibility and provide a warning of the presence of the bicycle in poor lighting conditions. The device comprises a resilient and flexible elongated hollow tubular structure rendered highly visually reflective by application of a coating or film of enclosed lens reflective material thereon. The tubular structure is readily attached to the spokes of a bicycle wheel, thus providing a large and broad effective area for visually responding to incident light radiation so as to provide a source of retro-reflective light.

2 Claims, 1 Drawing Sheet

HIGH VISIBILITY REFLECTIVE TUBING FOR BICYCLE WHEELS

The present invention relates generally to an improved device for providing a visual indication of the presence of a bicycle in poor lighting conditions, such as during the nighttime, or during other periods such as when occurs in dawn, dusk, and/or foggy conditions. In the past, various attempts have been made to provide illumination on bicycles and similar conveyances, however these devices along with related systems and techniques have suffered from the creation of blind spots due to article placement, or other properties that may be lacking in the system. The arrangement of the present invention employs a layer of highly retro-reflective material applied to the spokes of a bicycle wheel, thereby providing a broad and accordingly large effective reflective area. The reflective material provides a stark visual warning to oncoming vehicles, thereby providing an added measure of safety and protection for a bicyclist operating in poor ambient light conditions.

Bicyclists frequently travel and use the roadways in the presence of self-propelled motor vehicles such as automobiles, trucks and the like. While bicyclists are encouraged to employ all possible means of alerting others to their presence, poor lighting conditions and oversight may combine to create dangerous situations for these individuals. Additionally, some states, counties and/or municipalities may provide statutes, ordinances, or other regulations which require the use of lighting and/or reflective clothing, and such activities do indeed help provide protection in certain conditions, but not necessarily under all possible situations. For example, a motorist's view of a bicyclist may be partially obscured, impeded or impaired due to curvatures in a road lane, or the presence of other obstructions which prevent a clear view. In such circumstances, a motorist may either be unable to see the bicyclist, or may fail to do so for a variety of other reasons.

In the past, various techniques have been employed for providing a light emitting material such as a fluorescent, luminescent, or iridescent substance. These sources of light, while helpful, do not always perform as desired. For example, certain fluorescent materials may respond only to incident radiation below a certain wavelength, and higher wavelengths may have little, if any, effect upon the fluorescent property. Luminescent materials, by their very nature, may need frequent "charging-up" by exposure to incident radiation, with luminescent materials being subject to a decay in intensity.

Accordingly, it has been recognized that more highly visible devices are desirable for use on bicycles to enhance the ability of a motorist to observe the bicyclist from a safe distance. In this connection, therefore, a retro-reflective material consisting of an enclosed lens reflective sheeting has been found to provide an added measure of safety and protection for the bicyclist. This is particularly true when the effective area of retro-reflectivity is rendered relatively large, such as by attachment of retro-reflective materials to the spokes of a bicycle wheel. In such situations, virtually the entire area of the wheel becomes a source of reflected light due to the retro-reflective characteristics of the structure which incorporates an enclosed lens reflective sheeting thereon.

SUMMARY OF THE INVENTION

In accordance with the present invention, a resilient and flexible elongated hollow tubular structure is rendered highly visually reflective by application of a coating or film of enclosed lens reflective material. The hollow tubular structure is provided with a means for attachment to the spokes of a bicycle wheel, thus providing a large or broad effective area for visually responding to incident radiation and providing a source of retro-reflective light. This light, in order to be highly effective, typically has a coefficient of retro-reflection in excess of about 60. Such a material has been found to provide a relatively bright source of reflective radiation in response to incident radiation particularly the headlights of a vehicle, or other sources of ambient radiation disposed between the ambient source and the observer. Vehicle lights are, of course, a primary source of incident radiation, although other sources such as street lights, yard lights, and the like may provide an appropriate source. As indicated, the elongated hollow tubular member is adapted to be attached or otherwise coupled to the spokes of a bicycle wheel. This is conveniently achieved through the formation of a slot along the length of the tubular member so that the spoke may be introduced through the slot. Other forms of attachment are also possible, such as through the use of a hollow tube which is adapted to be placed upon the spoke of a bicycle wheel when the spoke has been temporarily detached from the wheel.

Therefore, it is a primary object of the present invention to provide an improved device for alerting motorists and others to the presence of bicyclists, wherein the device comprises a resilient and flexible elongated hollow tubular member adapted to be attached or otherwise coupled to the spoke of a bicycle wheel, and wherein the hollow tubular member is provided with a coating consisting of enclosed lens reflective sheeting having a coefficient of retro-reflection in excess of about 60 .

Other and further objects of the present invention will become apparent to those skilled in the art upon a study of the following specification, appended claims, and accompanying drawings.

DESCRIPTION OF THE PREFERRED EMBODIMENT

Figure 3:
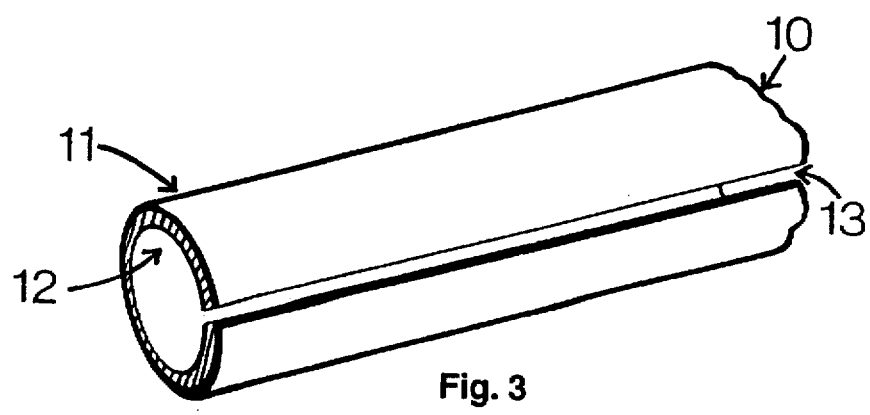
FIG. 3 is a perspective view of an alternate embodiment of the device of FIG. 2, with this embodiment illustrating a further step being taken to form the embodiment.

In accordance with one alternate preferred embodiment of the present invention as shown in FIG. 3, the resilient and flexible elongated hollow tubular reflective warning device is shown at 10, with the device being fabricated as a length of synthetic resin tubing, and having inner and outer coaxial surfaces. The hollow tubular structure is rendered highly visually reflective by virtue of the application of a coating, film or covering of an enclosed lens reflective material such as sheeting 11, and with the material being secured to the outer surface of a substrate in the form of inner tubular member or structure 12. The warning device 10 is adapted for attachment to the spokes of a bicycle wheel through formation of a slit along the entire length of the hollow tube as shown at 13.

The substrate or inner tubular structure 12 for the hollow tubular plastic warning device 10 is preferably fabricated from polyethylene, polypropylene, or other synthetic resin material. The physical properties of the synthetic resin material should be such that a tube formed therefrom is both resilient and flexible, and thus capable of retrofitting upon existing bicycles.

As has been indicated, the substrate 12 utilized for the lens reflective sheeting 11 is in the form of an inner tubular member with coaxial inner and outer surfaces as at 14 and 15 (see FIG. 2), and with a slot 13 being formed through the wall along the entire axial length of the member. The highly retro-reflective sheet material or film 11 is commercially available from the 3M Company of St. Paul, Minn. under the code name "Scotchlite Plus". The enclosed lens reflective sheeting 11, in order to be effective for providing adequate retro-reflection for this application typically has a coefficient of retro-reflection in excess of about 60. The coefficient of retro-reflection is in units of candlepower per foot-candle per square foot, or alternatively, candelas per lux per square meter. Values are obtained at an entrance angle of −4 degrees and an observation angle of 0.2 degrees. The entrance angle is formed by an incident light beam striking a planar surface at a given point and a line extending perpendicularly to the planar surface at the incident point. The observation angle, on the other hand, is the angle formed by the light beam striking a reflective surface and the light beam returning to the observer.

Figure 1:
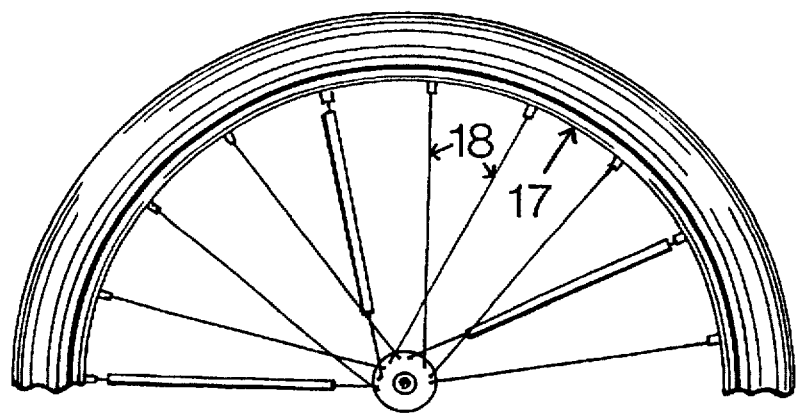
FIG. 1 is a perspective view of a resilient and flexible elongated hollow tubular device attached to the spokes of a bicycle wheel and being rendered highly visually reflective by application of a layer of enclosed lens reflective sheeting to the outer surface of the tubular device, with remaining portions of the bicycle wheel being cut away.
Figure 2:
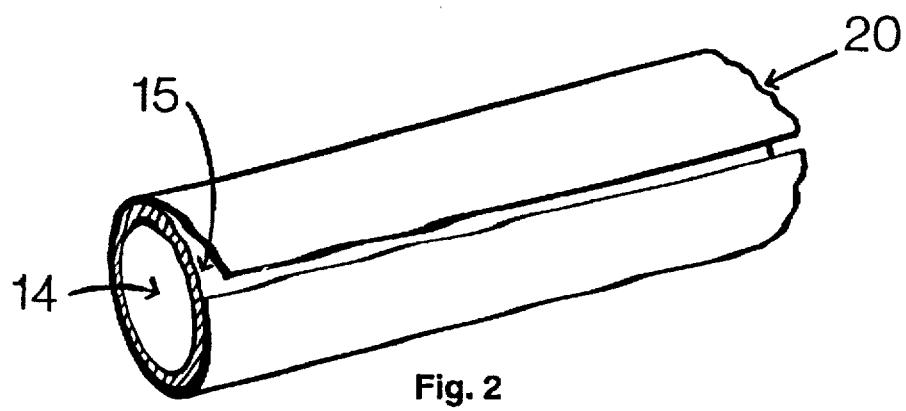
FIG. 2 is a perspective view of one embodiment of the tubular device of FIG. 1 showing a layer of reflective sheeting being attached to a hollow plastic tube.

With continued attention being directed to FIGS. 1–3 of the drawings, it will be noted that resilient and flexible elongated hollow tubular warning device generally designated 10 includes inner and outer components 12 and 11 respectively, with slot 13 being preferably formed through the combined wall thickness along the entire axial length of the device 10. When fabricated from a material such as polyethylene, polypropylene, or a vinyl material, the resilient flexible characteristics will provide for sufficient durability of the product along with appropriate flexibility and resiliency. A wall thickness of approximately 0.010 mils is normally appropriate for member 12. As is indicated in FIG. 1, elongated tubular warning device 10 is easily mounted upon bicycle spokes 18.

With attention being particularly and specifically directed to FIG. 2, a second alternate preferred embodiment is illustrated, with this embodiment illustrating the warning device generally designated 20 in essentially the same form as that of FIG. 3, with the exception being the lack of slot 13. This arrangement may be utilized in the event it is desired to mount the warning device onto spokes before assembly of the wheel. Such an arrangement may be conveniently undertaken during initial assembly of the wheel, or alternatively, when the wheel is fully or partially disassembled for one reason or another. Thus, in order to form the device of FIG. 2, the step of forming slot 13 is merely eliminated.

As indicated in FIG. 1, bicycle wheel 17 is provided with a plurality of individual spokes 18—18 upon which there will be mounted a total of six elongated hollow tubular warning devices of the present invention. These tubular warning devices are fixed at approximately equally spaced angular positions around the wheel, and thus when in motion, provide the appearance of a relatively broad area. The layer of enclosed lens reflective sheeting, illustrated at 11 in FIG. 3 is capable of providing the basis for the creation of retro-reflective light.

For the selection of colors which provide the appropriately high coefficient of retro-reflection, colors such as white, gold and yellow typically provide such a coefficient. These materials are, of course, commercially available from the 3M Company, as indicated, under the code designation "580-10", "580-64" and "580-71" respectively.

While the above specification provides specific examples of the preferred embodiment, it is understood that those skilled in the art may depart from these specific examples without departing from the spirit and scope of the present invention.

What is claimed is:

1. A resilient and flexible elongated hollow tubular highly visually reflective attachment for use in combination with the spokes of a bicycle wheel and comprising, in combination:

(a) an elongated hollow tubular plastic member having a hollow central core defining means for attachment to the spoke of a bicycle wheel and defining an axis, and being fabricated of synthetic resin, said tubular member further having a wall defining inner and outer coaxial surfaces;

(b) a layer of a highly retro-reflective substance consisting of a covering of enclosed lens reflective sheeting secured to said outer surface and providing a source of visible reflected light from incident light energy striking said elongated hollow tubular member;

(c) said elongated hollow tubular member being adapted for attached coupling to the spokes of a bicycle wheel along the entire length thereof; and (d) said retro-reflective substance having a coefficient of retro-reflectivity greater than about 60.

2. The combination as defined in claim 1 being particularly characterized in that said attachment means includes a slot formed through said tubular wall along the entire axial length thereof.

* * * * *